United States Patent [19]

Kim et al.

[11] 4,257,922

[45] Mar. 24, 1981

[54] PROCESS FOR COAL LIQUEFACTION AND CATALYST

[75] Inventors: Dae K. Kim, Naperville; Ralph J. Bertolacini, Chesterton; L. Charles Gutberlet, Wheaton; Ken K. Robinson, St. Charles, all of Ill.

[73] Assignee: Electric Power Research Institute, Inc., Palo Alto, Calif.

[21] Appl. No.: 20,209

[22] Filed: Mar. 13, 1979

[51] Int. Cl.³ .................. B01J 23/16; B01J 23/00
[52] U.S. Cl. ........................... 252/465; 252/461
[58] Field of Search ....................... 252/461, 465

[56] References Cited

U.S. PATENT DOCUMENTS

| | | | |
|---|---|---|---|
| 2,890,162 | 6/1959 | Anderson, Jr. et al. | 252/465 X |
| 3,322,666 | 5/1967 | Beuther et al. | 208/254 H |
| 3,393,148 | 7/1968 | Betolacini et al. | 252/465 |
| 3,635,814 | 1/1972 | Rieve et al. | 208/10 |
| 3,985,684 | 10/1976 | Arey, Jr. et al. | 252/465 X |
| 3,998,722 | 12/1976 | Moyer et al. | 252/465 X |

*Primary Examiner*—Delbert E. Gantz
*Assistant Examiner*—William G. Wright
*Attorney, Agent, or Firm*—Flehr, Hohbach, Test, Albritton & Herbert

[57] ABSTRACT

A method for hydroconversion of coal solids in a solvent by contact with molecular hydrogen and catalyst solids in a reactor. The catalyst solids are catalytically active substances including promoted or unpromoted molybdenum on an alumina support material. The support is characterized by bimodal pore distribution with the average diameter of the smaller pores ranging from about 100–200 angstroms and preferably 120–140 angstroms, and average diameter of the larger pores being in excess of 1,000 angstroms.

8 Claims, 8 Drawing Figures

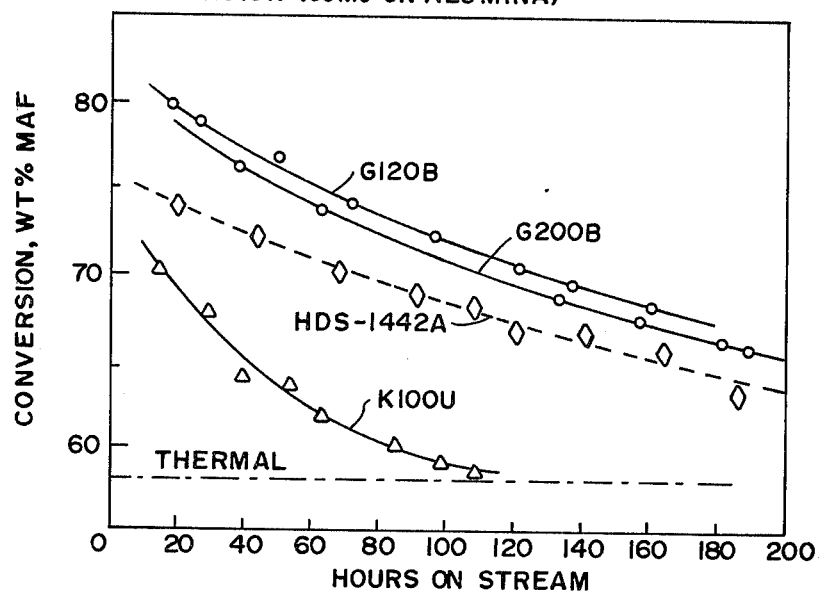
FIG.—1
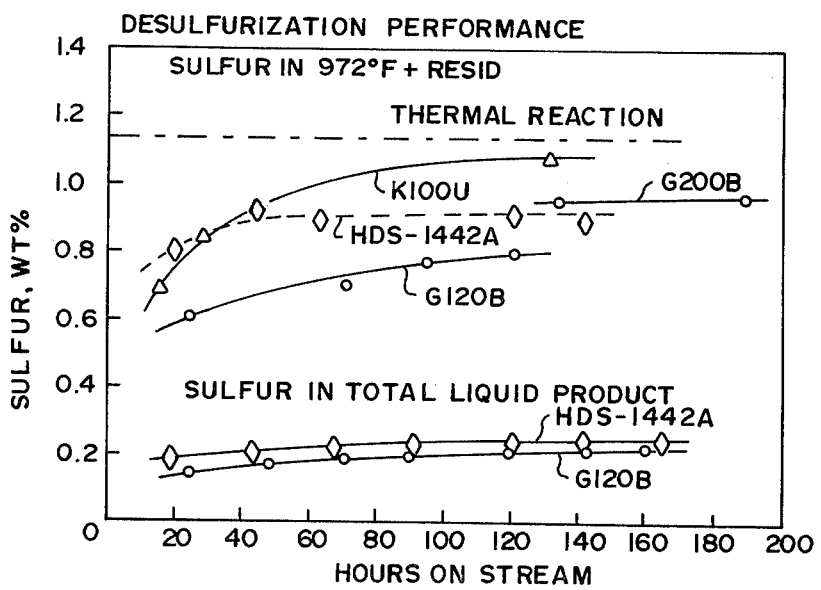
FIG.—2

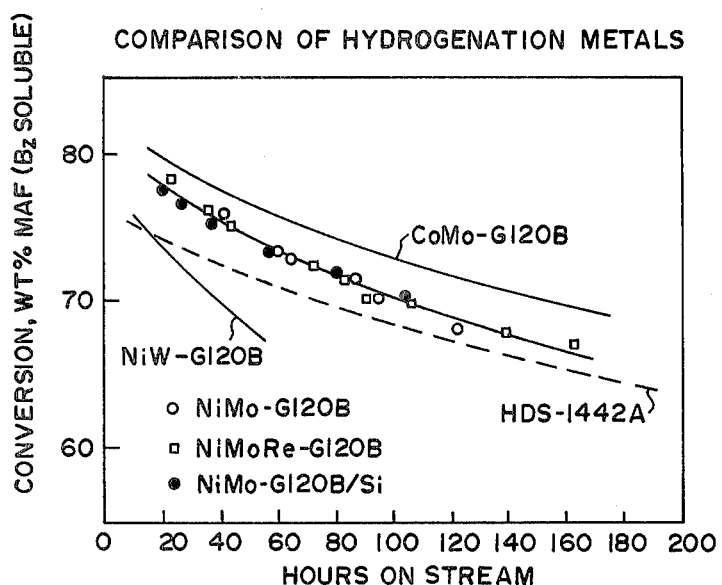
FIG.—3
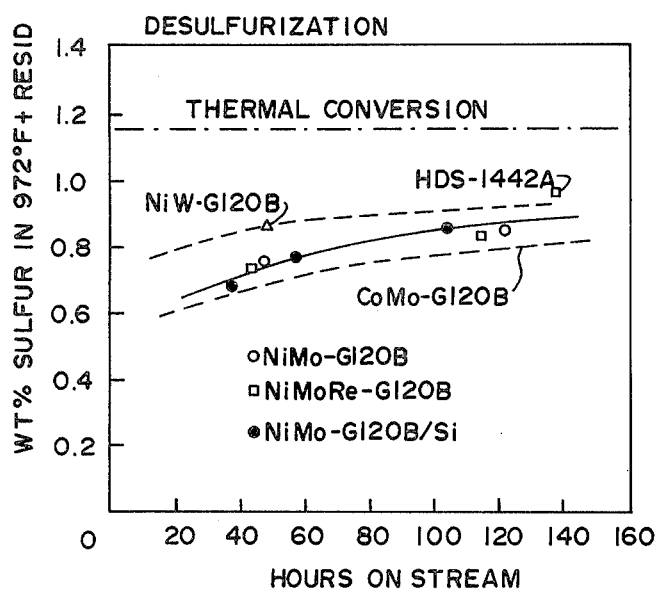
FIG.—4

FIG.—6

PROCESS FOR COAL LIQUEFACTION AND CATALYST

CROSS-REFERENCE TO RELATED APPLICATION

Reference is made to copending U.S. patent application entitled "Process for Upgrading Coal Liquids," Ser. No. 020,208, filed simultaneously herewith, now abandoned.

BACKGROUND OF THE INVENTION

The invention relates to catalytic hydroconversion of coal to liquid and gaseous products, and more particularly to a supported catalyst for this process including bimodal pore distribution.

A number of processes have been described in the literature relating to the hydroconversion of pulverized coal to coal liquid in the presence of molecular hydrogen and a catalyst in a catalytic reactor. In one process, coal conversion involves slurrifying solid pulverized coal in a solvent which is directed through a reactor with the hydrogen gas stream under high pressure and temperature. After conversion, the slurry product is collected. One such process, referred to as the H-Coal process, by Hydrocarbon Research, Inc., is performed in an ebullated catalyst fixed tubular reactor in which the catalyst and coal slurry are suspended and mixed.

The catalyst employed in the above processes include a variety of catalytically active substances deposited on porous support particles having large surface area. As set out in the background of U.S. Pat. No. 3,635,814, previous investigators have indicated that the pore size for a catalyst is on the order of 50 to 250 angstroms with the most frequent pore size being 60 angstroms. Many of such catalysts are of unimodal distribution, that is, including only one major distribution peak of average diameters of pore volume. On the other hand, there is a product on the market designated HDS-1442A by American Cyanamid Corporation with bimodal pore distribution having a major peak of smaller pore volume distribution (below 600 angstroms) and a second major peak pore volume distribution above 1,000 angstroms.

One problem with coal liquefaction catalysts is that they tend to deactivate during use as by clogging of the pores. This limits the effective life of the catalyst prior to regeneration.

SUMMARY OF THE INVENTION AND OBJECTS

It is an object of the invention to provide a catalyst suitable for the hydroconversion of coal solids capable of producing a low sulfur pumpable liquid product without excessive consumption of hydrogen.

It is another object of the invention to provide a catalyst of the foregoing type which does not deactivate rapidly under coal hydroconversion conditions.

Further objects and features of the invention will be apparent from the following description taken in conjunction with the appended drawings.

In accordance with the above objects, a catalyst is provided which is particularly useful for coal liquefaction. It includes a catalytically active substance, preferably unpromoted molybdenum or molybdenum promoted with cobalt or nickel, supported on particles with bimodal pore distribution. The smaller pore average diameter range from 100-200 angstroms and preferably 100-150 angstroms while the large pore average diameter is in excess of 1000 angstroms. This catalyst promotes high coal conversion to form a low sulfur product and with low hydrogen consumption.

BRIEF DESCRIPTION OF THE DRAWINGS

FIG. 1 is a graph of benzene soluble conversion for a cobalt molybdenum catalyst on alumina comparing the substrates of the present invention with those of the prior art.

FIG. 2 is a graph of desulfurization performance as a function of hours on stream for the catalysts of FIG. 1.

FIG. 3 is a comparison of hydrogenation metals in a plot of conversion in weight percent against hours on stream.

FIG. 4 is a plot of the desulfurization performance of various catalysts, some of which employ the support substrate of the present invention.

DETAILED DESCRIPTION OF THE PREFERRED EMBODIMENTS

Figure 5:
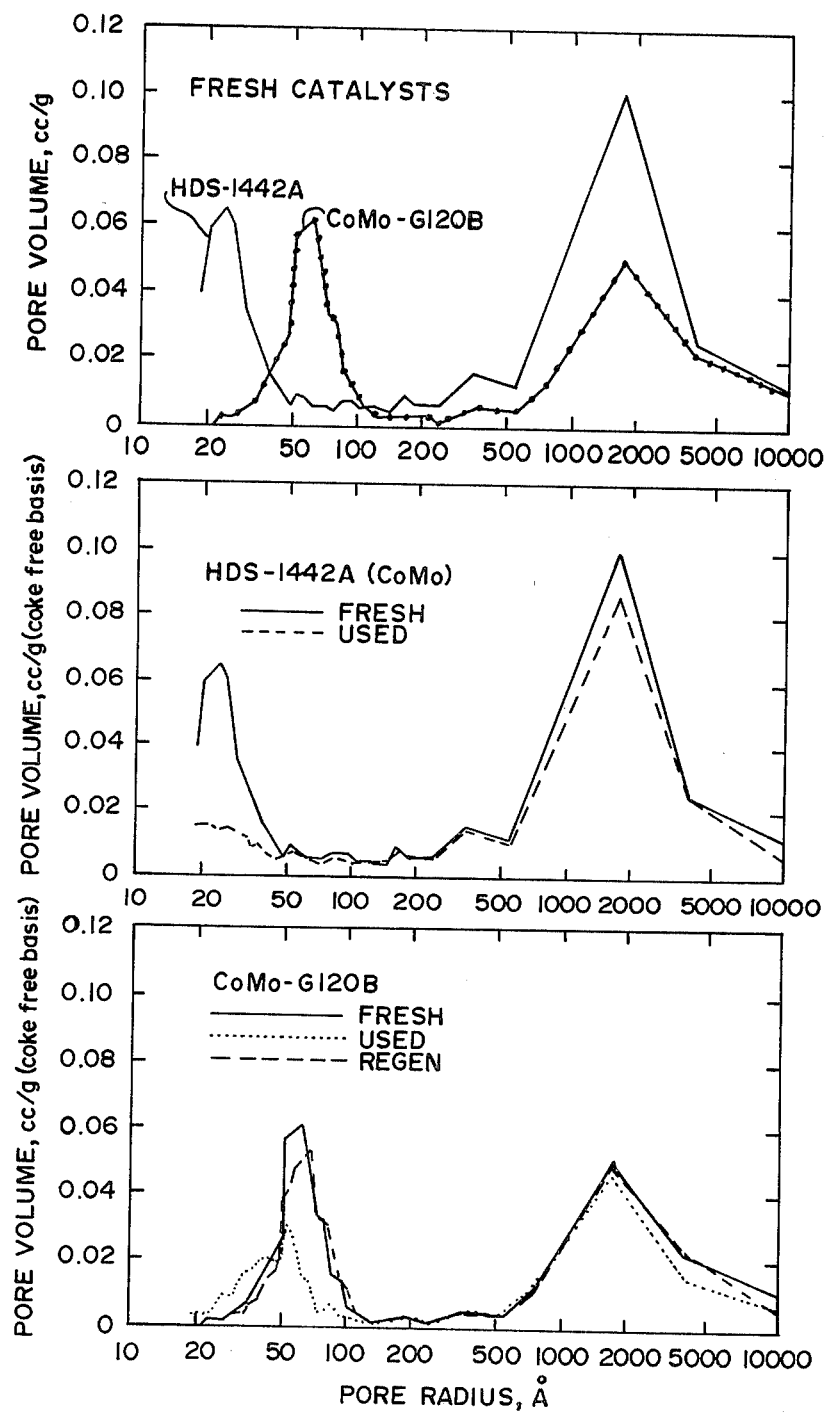
FIG. 5 illustrates pore size distribution plotting pore radius versus pore volume for catalyst substrates of the present invention in comparison to one of the prior art.

The present invention is directed to a catalyst suitable for hydroconversion of coal solids to liquid and gaseous products and to the process of hydroconversion. The term "coal" includes any form of solid carbonaceous substance suitable for catalytic hydroconversion, for example, bituminous, semi-bituminous, sub-bituminous grades of coal including lignites, kerogen, peats, semi-anthracite, and the like. Typically, mined coal is pulverized to a size wherein most of the coal solids are less than 8 mesh (U.S. sieve series) and typically in the size range of 8 mesh to 325 mesh and typically about 40 mesh.

In a preferred process, the coal is first formed into a slurry before contacting with hydrogen and catalyst. A suitable slurry comprises an organic solvent, preferably derived from the coal liquefaction process. Because of the difficulties involved in pumping high solids content slurries, a preferred slurry content is generally less than 70 weight percent coal solids based upon the slurry mixture. Suitable concentrations are on the order of 20–70 weight % coal solids.

In the reaction zone, the coal solids undergo liquefaction and hydroconversion. The conversion is accomplished in the presence of molecular hydrogen and the catalyst of the present invention. There are a number of known coal liquefaction and hydroconversion processes which employ a hydrogenation catalyst. In some instances, the coal slurry, catalyst and hydrogen are contacted at elevated temperatures and pressures in the reactor. As set out above, in one process, known as the H-Coal process, the pulverized coal slurry and hydrogen is fed to the reactor in which the catalyst is present. The reaction is performed under ebullated conditions. Or the reaction may be performed in a fixed bed tubular reactor which contains the catalyst solids. Suitable conditions for performing the hydroconversion such as temperature, pressure, flow rates of reactants, charge and the like are well known to those skilled in the art.

One catalytic coal conversion process is disclosed in U.S. Pat. No. 3,635,814, the disclosure of which is incorporated at this point by reference.

The present invention relates to a catalyst suitable for the performance of coal liquefaction and hydroconversion as of the foregoing type. While the catalyst will be disclosed in terms of this environment, it should be understood that it has other applications, such as for upgrading coal as disclosed in the aforementioned copending U.S. application entitled "Process for Upgrading Coal Liquids," Ser. No. 020,208, filed simultaneously herewith, and now abandoned.

A major feature of the present invention is the discovery of an exceptional catalyst for processes of the foregoing type containing a particular essentially bimodal pore distribution. As defined herein, bimodal distribution means a pore distribution including two major peaks of pore diameters measured as a plot of pore volume in cc/gram versus pore diameter or radius. More specifically, in this bimodal distribution, the smaller pores are defined as having peak concentrations being below about 600 angstroms in diameter and the larger pores are defined as being above that value. The average diameter of the smaller pores range from about 100 to 200 angstroms, and preferably 100-150 angstroms. The average diameters of the larger pores are in excess of 1,000 angstroms and generally range from 1,000 to 10,000 angstroms. A more preferred size distribution for the smaller pore range is about 120 to 140 angstroms average diameter and more specifically on the order of 125 angstroms. In a preferred product, the small pores have diameters predominantly in the range of 70 to 200 angstroms.

A number of significant advantages are obtained by use of a substrate of the foregoing type for the catalyst. For example, such bimodal catalysts are more active for both coal liquefaction conversion and sulfur reduction. The theory to explain such higher effiency as follows. The smaller pores are the most catalytically active. However, small pores are subject to clogging during long term use as during desulfurization. The larger pores may not be catalytically active but provide access to the smaller pores to account for the ability of the catalyst to convert the coal to a liquid product at high conversion efficiencies during long term operation and to provide an ultimate coal liquid of low sulfur content and low viscosity.

A suitable surface area for the bimodal substrate particles of the present invention is on the order of 100 to 250 m$^2$/gm. This value is a factor in determining the amount of larger pores and smaller pores.

It has been found that at least 5% of larger pores and preferably about 7 to 20% of the larger pores are preferable to accomplish the superior properties of the present invention. Conversely, it has been found that the catalyst preferably includes at least 70% of the smaller pores, and preferably about 80 to 93%, to provide the desired catalytic activity.

The substrate of the present invention may be formed of conventional material such as alumina in catalytic form such as gamma-alumina. Although such alumina may be pure, it may contain minor amounts of other oxides that are inert under the conditions at which it is used. Suitable substrate materials, although with different pore size distributions, are set out in Bertolacini et al U.S. Pat. No. 3,393,148, incorporated herein by reference. Other presently available catalytic substrates may also be employed such as those used by Hydrocarbon Research, Inc. in the H-Coal process. These materials are formed from boehmite starting materials. The alumina support may contain silica or other materials inert to the process. Other support materials such as silica-alumina and catalytically active clays may also be employed.

A variety of procedures may be employed for preparing the alumina support particles. In general, the smaller pores are associated with the alumina base material. The larger pores can be formed by known techniques such as grinding the alumina into a fine powder and then binding the particles together into spheres or extrudates. During that process, the large pores are generated. Other techniques could be to employ pore growth promotors. Pore growth promotion would be accomplished by heating the material in the presence of a gas or metal compound, steaming at elevated temperatures, treating with hydrogen at elevated temperatures, or the like. In another procedure, the large pores may be introduced during preparation of the base material by the use of a strong mineral or organic acid for leaching. Still another procedure would be to introduce into the alumina structure, a removable material which may be volatile or decomposable in the gases by the application of heat. For example, ammonium carbonate, naphthalene, anthracene, volatile aromatics, and the like have been employed. The amount of removable solids employed depends upon the desired pore size.

A number of different catalytically active substances may be deposited on the surface of the bimodal substrate of the present invention. A preferred catalyst substance is molybdenum in the form of $MoO_3$. When this material is employed by itself, that is, unpromoted by any other catalyst, it again provides superior liquefaction performance and slower conversion declines during time on the stream.

Other known catalysts may be employed as promotors for the molybdenum. For example, nickel and/or cobalt are beneficially employed in combination with the molybdenum for superior desulfurization or other superior properties.

A preferred catalyst includes between about 5 and 20 weight % of molybdenum measured as $MoO_3$. If it is employed in combination with the aforementioned promotors, it preferably also includes 0.5 to 4 weight % Co and/or Ni measured as CoO and/or NiO respectively. For example, one preferred composition includes 3 weight % CoO and 15 weight % $MoO_3$.

A suitable technique for depositing the catalytic substances on the substrate is to impregnate. For example, to deposit molybdenum and cobalt, the catalyst may be impregnated with an aqueous solution of ammonium molybdate and cobalt nitrate. The finished catalysts are calcined at say 1000° F. and contain a nominal composition of 3 weight % cobalt (CoO) and 15 weight % $MoO_3$.

The particle size of the catalyst support substrate should be small enough to provide the desired contact area and to be readily ebullated as in the H-Coal process. On the other hand, it must be substantially larger than the coal particle sizes to be contained in a fixed bed while the reactants flow through the same.

A general disclosure of techniques for catalyst formation is found in an article by Higginson, G.W., *Chem. Eng.*, Sept. 30, 1974. A more detailed disclosure of suitable catalyst forming techniques is found in Long et al. U.S. Pat. No. 3,989,645.

A further disclosure of the nature of the present invention is provided by the following specific examples of the practice of the invention. It should be understood that the data disclosed serve only as examples and are not intended to limit the scope of the invention.

EXAMPLE 1

A first comparative series of tests were formed comparing the catalyst of the present invention with other known catalysts and with the thermal level. That is, the result obtained by using thermal conversion in the absence of catalyst. In this series, the catalyst of the present invention was prepared as follows. A series of alumina catalysts was prepared by W. R. Grace Company from boehmite starting material to have pore sizes as illustrated in FIG. 5 and discussed below. The alumina support particles were then impregnated with an aqueous solution of ammonium molybdate and cobalt nitrate. The finished catalysts were calcined at 1000° F. and contained nominally 3% $CoO_3$ and 15% $MoO_3$.

Catalysts of the foregoing type were employed with feed stock as set forth in the following Table I.

TABLE I
FEEDSTOCK INSPECTIONS

| Elemental, Wt. % | Hydrotreated Anthracene Oil | Illinois No. 6 Coal Burning Star Mine |
|---|---|---|
| Carbon | 91.9 | 67.6 |
| Hydrogen | 6.0 | 4.6 |
| Sulfur | 0.4 | 3.3 |
| Nitrogen | 0.6 | 1.3 |
| Oxygen | 1.0 | 9.0 |
| Moisture | 0.03 | 3.3 |
| Ash | — | 10.9 |
| Distillation, °F. | | |
| IBP | | 520 |
| 70% Off | | 677 |
| FBP | | 847 |

The catalyst test conditions are set forth in the following Table II.

TABLE II
CATALYST TEST CONDITIONS

| | |
|---|---|
| Catalyst charge | : 60 cc, 1/16" extrudate |
| Coal Slurry | : 20 wt. % Ill #6 (-400 mesh) in hydrogenated anthracene oil |
| Reactor Holdup | : 320 cc |
| Pressure | : 137 Atm (2000 psi) |
| Temperature | : 427° C. (800° F.) |
| $H_2$ Feed Rate | : 170 liter/hr (6 SCFH) |
| Slurry Feed Rate | : 400 g/hr |
| Residence Time | : 48 minutes |
| LHSV | : 1.33 g-coal/hr/cc-catalyst |
| Mixing Speed | : 1500 rpm |

The catalyst of the present invention, designated the "bimodal catalyst" was compared with a unimodal catalyst having only the smaller pore sizes and not the larger ones. It was also compared with another catalyst containing nickel instead of cobalt and a third catalyst using the commercially available HDS-1442A product of American Cyanamid. The pore size of the latter catalyst is compared with the present bimodal catalyst in FIG. 5.

The coal slurry was pumped into the reactor with hydrogen and catalyst and a slurry product stream was removed. Referring to Table 3, the properties of the HDS-1442A catalyst is compared to two catalysts; one cobalt molybdenum and the other nickel molybdenum on the support substrates of the present invention. The former one is designated CoMo-G120B and the latter NiMo-G120B. Two different analytical techniques, nitrogen desorption and mercury penetration were employed. The abbreviations are as follows:

SA = surface area;
APD = average pore diameter; and
PV = pore volume.

TABLE III
CATALYST DATA

| | $N_2$ Desorption Down to 20 angstroms | | | Hg Penetration Up to $10^5$ angstroms | | | Pore Volume of $10^3$–$10^5$ Å |
|---|---|---|---|---|---|---|---|
| | SA $m^2/g$ | APD Å | PV cc/g | SA $m^2/g$ | APD Å | PV cc/g | % of total |
| HDS-1442A | | | | | | | |
| Fresh | 323 | 58 | 0.64 | 344 | 91 | .767 | 26 |
| Spent (coke free basis | 177 | 65 | 0.42 | 120 | 131 | .404 | 40 |
| Regen | 191 | 79 | 0.55 | 184 | 114 | .523 | 27 |
| CoMo-G120B | | | | | | | |
| Fresh | 162 | 111 | .615 | 178 | 131 | .585 | 17 |
| Spent (coke free basis) | 149 | 92 | .419 | 142 | 109 | .389 | 22 |
| Regen | 133 | 114 | .504 | 149 | 140 | .522 | 18 |
| NiMo-G120B | | | | | | | |
| Fresh | 163 | 114 | 200 .624 | 180 | 141 | .635 | — |
| Spent | | | | 117 | 147 | .433 | — |
| Regen | — | — | — | — | — | — | — |

A substrate of the present invention was utilized in a series of tests; one utilizing unpromoted molybdenum (designated Mo-G120B) and the other utilizing the aforementioned CoMo-G120B and compared with HDS-1442A catalyst in Table IV below.

TABLE IV
EVALUATION OF CATALYST PERFORMANCE

| | HDS-1442A | Mo-G120B | CoMo-G120B |
|---|---|---|---|
| Catalyst Age, lbs coal/lbs catalyst | 141 | 145 | 138 |
| Coal conversion, wt. % maf | 93.7 | 94.5 | 94.0 |
| Wt. % of dry coal | | | |
| $C_4$-975° F. distillate | 41.9 | 44.8 | 45.6 |
| 975° F. + residuum | 26.0 | 0.44 | 21.8 |
| Sulfur in residual oil, wt. % | 0.46 | 0.44 | 0.34 |
| 975° F. + filter liquid | | | |
| Test period (days on stream) | 10 | 12 | 11 |
| Viscosity at 450° F. cps | 20,500 | 7,300 | 3,800 |

The product distribution is illustrated under weight % of dry coal with the $C_4$ to 975° F. distillate compared against the 975° F. plus residuums or bottoms. The test period is an indication of the age of the catalyst.

An important feature of the invention is that the distillate of both the molybdenum and cobalt molybdenum catalyst is a higher proportion than the residuum, of significant benefit to the invention. In addition, both the Mo-G120B and CoMo-G120B provided a lower sulfur content in the residual oil with the latter material providing exceptionally low sulfur content.

Referring to FIG. 1, the conversion to benzene soluble products obtained with the subject CoMo-G120B catalyst as compared with HDS-1442A. It is apparent that the present product has higher initial activity and maintains its activity significantly better than the prior art product. Other catalysts are illustrated including a bimodal catalyst with an average pore diameter of 200 angstroms (G200B) which is slightly less active than catalyst G120B and more active than one using Kaiser average diameter of 100 angstroms unimodal alumina/(K100U) which exhibited poor performance.

Another feature of the invention is that the viscosity of the material is substantially lower for both of the present products in comparison to the HDS-1442A. Thus, CoMo-G120B has a viscosity of 3800 cps compared to 7300 Cps for Mo-G120B and 20,500 cps for the prior art product.

Referring to FIG. 5, the pore size distributions of the CoMo-G120B substrate are compared to that of the prior art HDS-1442A. It is apparent that there is a substantially different bimodal distribution. The prior art product has an average pore diameter substantially below that of the present product with a peak pore radius of between 20 and about 40 angstroms compared to applicant's peak pore radius of about 60 to 70 angstroms (120–140 angstroms diameter).

Referring to FIG. 2, desulfurization performance is illustrated. The significantly lower weight % of the sulfur in the product illustrates the advantage of the present product.

Referring to FIG. 3 and FIG. 4, the effect of varying catalyst metals is illustrated and compared to HDS-1442A using a cobalt molybdenum catalyst. The activity of the nickel molybdenum product (NiMo-G120B) is intermediate between CoMo-G120B and HDS-1442A with a somewhat higher deactivation rate indicated for the NiMo catalyst. Addition of silica to the support or rhenium to the catalyst has no apparent effect. The nickel promoted or cobalt promoted molybdenum is far superior to the nickel tungsten catalyst. The superior performance of the NiMo-G120B catalyst in comparison to HDS-1442A is attributed to the preferred support properties of the present substrate.

Referring to FIG. 5, the pore size distribution of fresh and used CoMo-G120B and HDS-1442A are compared. The bimodal structure of both catalysts is evident but the smaller pores in CoMo-G120B are larger than the smaller pores in HDS-1442A and, in a preferred pore size range center around a radius of 60–70 angstroms (120–140 angstroms diameter). After use, the HDS-1442A catalyst loses most of its small pore volume while the CoMo-G120B retains a substantial part of its small pore volume. Regeneration by controlled burning of coke deposited in the catalyst restored essentially all of the pore structure of the fresh CoMo-G120B.

EXAMPLE 2

Figure 6:
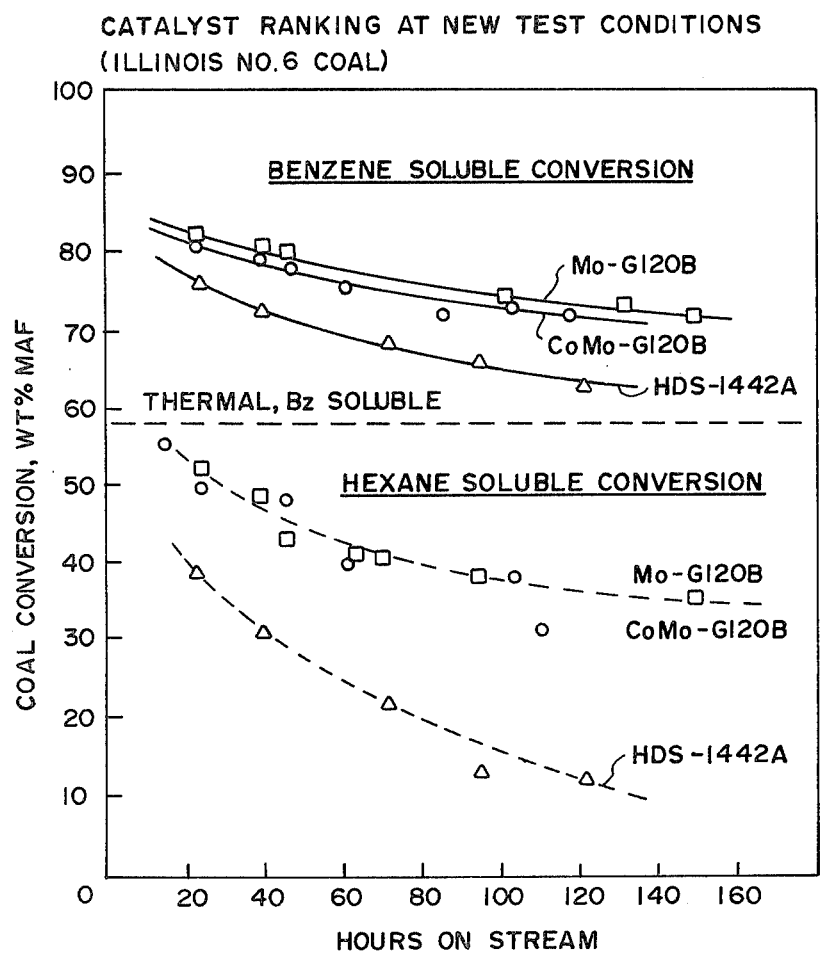
FIG. 6 is a plot of catalyst rankings in terms of coal conversion and different conditions than those of FIGS. 3 and 4.

A further evaluation of performance was made in the H-Coal continuous test unit of Example 1 under more severe conditions involving a higher coal solvent concentration (25 weight %) and higher temperature (825° F.). The advantage of CoMo-G120B over HDS-1442A was again clearly demonstrated as illustrated by the plot of conversion versus time in FIG. 6. The higher hexane soluble conversion obtained with the present catalyst is significant because it affects product viscosity, an important feature with respect to separation of liquid product from solid residue and fuel pumpability. As illustrated in FIG. 6, unpromoted molybdenum yields conversion similar to the cobalt promoted molybdenum product. However, the inclusion of cobalt in the catalyst is beneficial to sulfur removal.

EXAMPLE 3

Two cobalt molybdenum on aluminum catalysts, A and B, have an average pore diameter of about 122 angstroms, but Catalyst A has a bimodal pore distribution with the pores greater than 1000 angstroms in diameter occupying 10.3% of total pore volume. Catalyst B has a unimodal pore distribution with very few pores beyond 1000 angstroms as illustrated by Table V below.

TABLE V

| | CATALYST INSPECTION DATA | | | |
|---|---|---|---|---|
| Catalyst | Average Pore Diameter, Å | Surface Area m$^2$/g | Pore Volume cc/g | Pore Volume of 10$^3$–10$^5$ Å % of total |
| A | 122 | 154 | 0.60 | 10.3 |
| B | 124 | 160 | 0.62 | 2.2 |

Catalysts A and B, at 60 cc each in a 1/16" extrudable form, were tested for coal liquification at identical conditions. A 25 weight % of powdered Illinois No. 6 Coal slurried in a hydrotreated anthracene oil was continuously fed along with hydrogen to a continuously stirred reactor under 137 atmospheres and 440° C. Nominal residence time in the reactor was 44 minutes and liquid hourly space velocity (LHSV) based on coal feed was 1.79 g-coal/hr/cc-catalyst. The results are summarized in Table VI below.

TABLE VI

| | | LIQUEFACTION OF ILLINOIS No. 6 COAL | | | |
|---|---|---|---|---|---|
| | | Coal conversion to wt % maf | | Sulfur in 520° C. + | |
| Catalyst | Hours on stream | Benzene solubles | 520° C.− | residual, wt. % | Relative catalyst activity |
| A | 23 | 80.1 | 49.4 | 0.65 | 57 |
| | 120 | 71.1 | 42.0 | 0.81 | 15 |
| B | 23 | 72.7 | 41.3 | 0.74 | 26 |
| | 120 | 62.8 | 36.8 | 0.93 | 3 |

Table VI clearly indicates that the coal conversion to either benzene soluble liquid or products boiling below 520° C. on a moisture and ash free basis is much higher for Catalyst A than Catalyst B throughout the 120 hour test length. The relative activity is the catalyst activity relative to its initial activity calculated based on a reaction model using benzene soluble conversions. The calculation shows that both Catalyst A and B have practically the same initial activity for coal liquification owing to the similar average pore diameter, but Catalyst A with the bimodal pore distribution loses its activity much slower than Catalyst B. Catalyst A also gave lower sulfur contents in 520° C. plus residual product or better desulfurization than Catalyst B. This example clearly demonstrates the superior performance of the present catalyst.

EXAMPLE 4

Catalyst C, D and E were tested for liquefaction of a subbituminous Wyodak coal at the same test conditions as described in Example 3. The liquefaction solvent was the hydrotreated anthracene oil and coal concentration was 25 weight %.

Catalysts C and D are respectively molybdenum on alumina and cobalt molybdenum on aluminum prepared in laboratory by the impregnation method, and Catalyst E is a commercial cobalt molybdenum on aluminum manufactured by American Cyanamid Co. Catalyst inspection data are shown in Table VII. Catalyst C and E have bimodal pore distributions but different average pore diameter. Catalyst D has the same average pore diameter as Catalyst C, but the pore distribution is unimodal.

TABLE VII

CATALYST INSPECTION DATA

| Catalyst | Composition, wt% CoO | MoO₃ | Average Pore Diameter, Å | Surface Area, m²/g | Pore Volume cc/g | Pore Volume of 10³-10⁵Å, % of total |
|---|---|---|---|---|---|---|
| C | — | 15 | 123 | 167 | 0.65 | 9.6 |
| D | 3 | 16 | 124 | 153 | 0.62 | 2.2 |
| E | 3 | 13 | 58 | 323 | 0.65 | 26.1 |

The test results are summarized in Table VIII. Catalyst C, Which is unpromoted molybdenum on 120 angstroms bimodal alumina support, shows not only the best liquification conversion to benzene soluble material but also the lowest sulfur contents of the 520° C. +residual product.

The unimodal catalyst D with 120 angstroms average pore diameter is definitely inferior to Catalyst C, but the benzene soluble conversions are somewhat better than those obtained with Catalyst E having 60 angstroms average pore diameter.

For a given liquefaction level, the molybdenum Catalyst C consumes less hydrogen than cobalt molybdenum Catalyst D or E.

The example points out the importance of average pore diameter around 120 angstroms for a higher liquefaction activity, criticality of bimodal pore distribution for maintaining catalyst performance, and a unique attribute of molybdenum catalyst for reduced hydrogen usage.

TABLE VIII

LIQUEFACTION OF WYODAK COAL

| Catalyst | Hours on stream | Coal conversion to benzene solubles, wt % maf | Sulfur in 520° C. + residuals, wt % | H₂ consumption wt % of slurry feed |
|---|---|---|---|---|
| C | 25 | 80.7 | 0.19 | 0.92 |
|   | 120 | 71.8 | 0.32 | 0.53 |
| D | 25 | 78.3 | 0.23 | 1.17 |
|   | 120 | 64.6 | 0.36 | 0.52 |
| E | 20 | 74.9 | 0.22 | 0.94 |
|   | 115 | 63.7 | 0.36 | — |

EXAMPLE 5

Short term aging behavior of several CoMo catalysts are discussed and related to catalyst surface properties. The short term aging test lasts for about a week at the fixed standard test conditions and should be regarded as an accelerated deactivation test since the slurry oil used is relatively heavy and high boiling.

Four catalysts including the reference H-Coal catalyst, HDS-1442A, are listed in Table IX along with surface properties and apparent bulk density. The metals contents are nominally 3% CoO and 15% MoO₃. Average pore diameter is defined in such a manner that half of the pores measured by nitrogen desorption are smaller or greater than this diameter. The pore size is used as a primary parameter for correlating catalyst performance, since for given pore volume, surface area decreases with increasing average pore diameter. The pore size range which covers the majority of the pore volumes detectable by nitrogen desorption method gives an indication whether the pores are broadly or narrowly distributed. The pores greater than 1000 Å in diameter, which are measured by mercury penetration method, are usually created during the forming process of a support. These macro pores may not be catalytically active but could serve as feeder pores for transporting materials into catalyst interior. Catalysts that contain 1000 Å +macro pores in more than 10 volume percent of the total mercury pore volume are regarded as having a bimodal pore size distribution. According to this classification, only Kaiser-100UP has a unimodal pore distribution; the rest in Table IX have bimodal pore distribution.

TABLE IX

COBALT-MOLYBDENA CATALYST INSPECTION VARYING SURFACE PROPERTIES

| Catalyst | APD Å | SA m²/g | PV cc/g | Major Pores Å | 1000Å+ Pores Vol %[1] | ABD g/cc |
|---|---|---|---|---|---|---|
| HDS-1442A | 58 | 323 | .64 | 20-140 | 28 | 0.57 |
| Kaiser 100UP | 105 | 195 | .70 | 50-250 | 4 | 0.59 |
| G-120B | 111 | 162 | .62 | 70-200 | 17 | 0.68 |
| G-200B | 183 | 91 | .53 | 105-350 | 18 | 0.73 |

Figure 7:
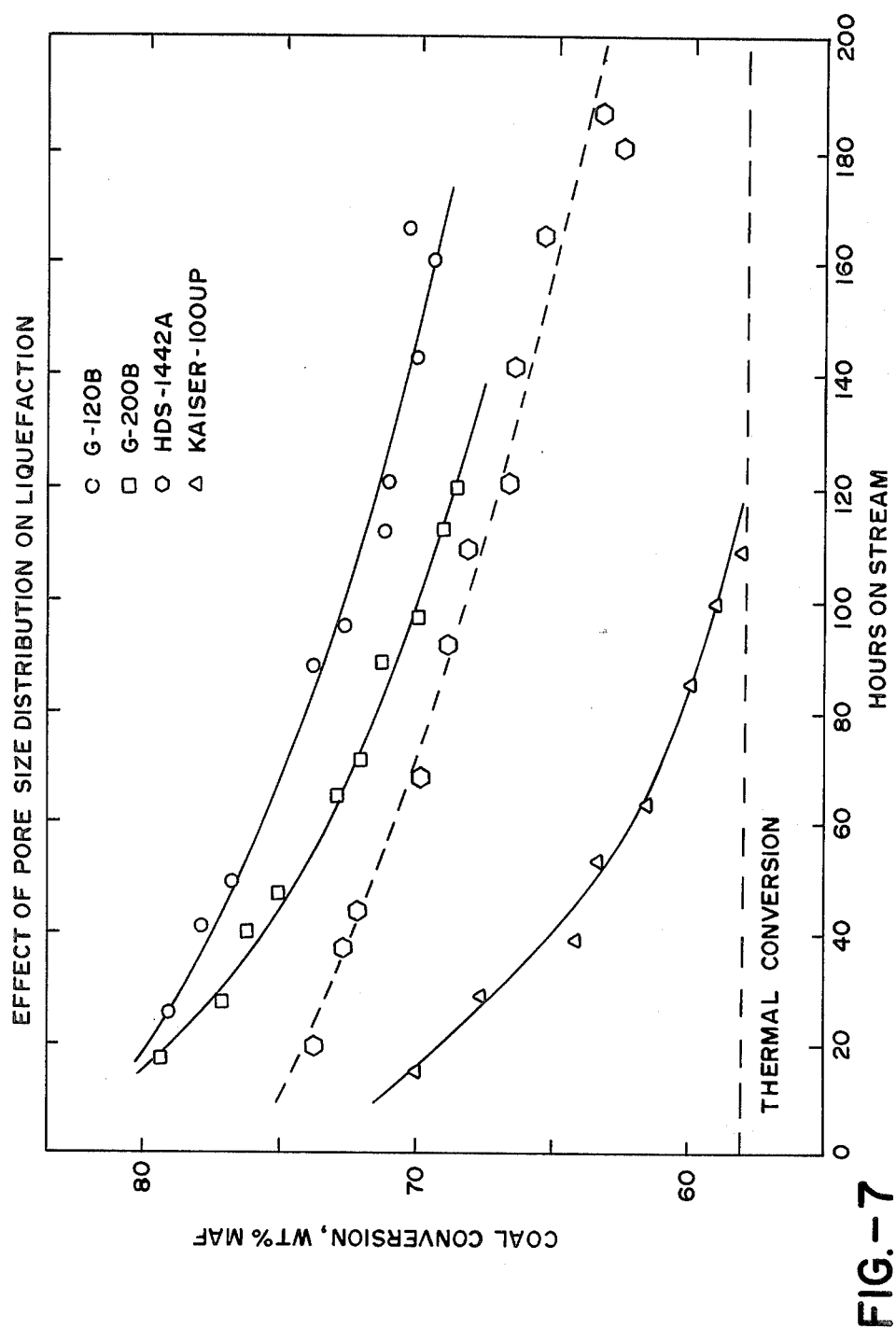
FIGS. 7 and 8 are plots of catalyst rankings of conversion and desulfurization, respectively, against hours on stream.

[1]By mercury porosimetry
B = bimodal
U = unimodal
P = phosphoric acid impregnating aid Coal conversion to benzene solubles is plotted versus time on stream in FIG. 7 for four CoMo-alumina catalysts differentiated by average pore diameters and pore size distribution. Compared to the reference HDS-1442A, which has about 60 Å average pore diameter, 120 Å bimodal catalyst (G120B) increased the benzene soluble conversion. A further increase in pore size to G200 Å bimodal catalyst (G200B) did not result in an additional improvement in conversion. Thus, the pores between 100 and 200 Å diameter appear to be most suitable for producing high quality liquefaction product-benzene soluble oil. This observation is similar to the batch screening result on the optimum pore size for initial conversion. Conversion to THF solubles is not presented because they are all about 93 weight % maf for all catalysts; thermal THF soluble conversion is the same value also.

The Kaiser 100 UP unimodal alumina starts out with high conversion but rapidly declines to the thermal level in spite of its large average pore diameter. However, the Kaiser alumina has a much broader pore distribution so that the pore volume in the desirable 100-200 Å range is smaller than 120 Å diameter catalyst, G120B, when compared on an equal volumetric loading basis. Another factor for the rapid deactivation of the Kaiser-100UP may be due to the unfavorable effect of phosphoric acid used during the catalyst impregnation; the conversion is still lower than phosphorous containing G120BP catalyst. In addition to these factors, the lack of bimodality in the Kaiser alumina could also have contributed to the rapid conversion decline. The other three catalysts have a bimodal pore distribution. The macro pores in bimodal catalysts are believed to be necessary for transporting materials into the catalyst interior and being less susceptible to pore plugging.

Figure 8:
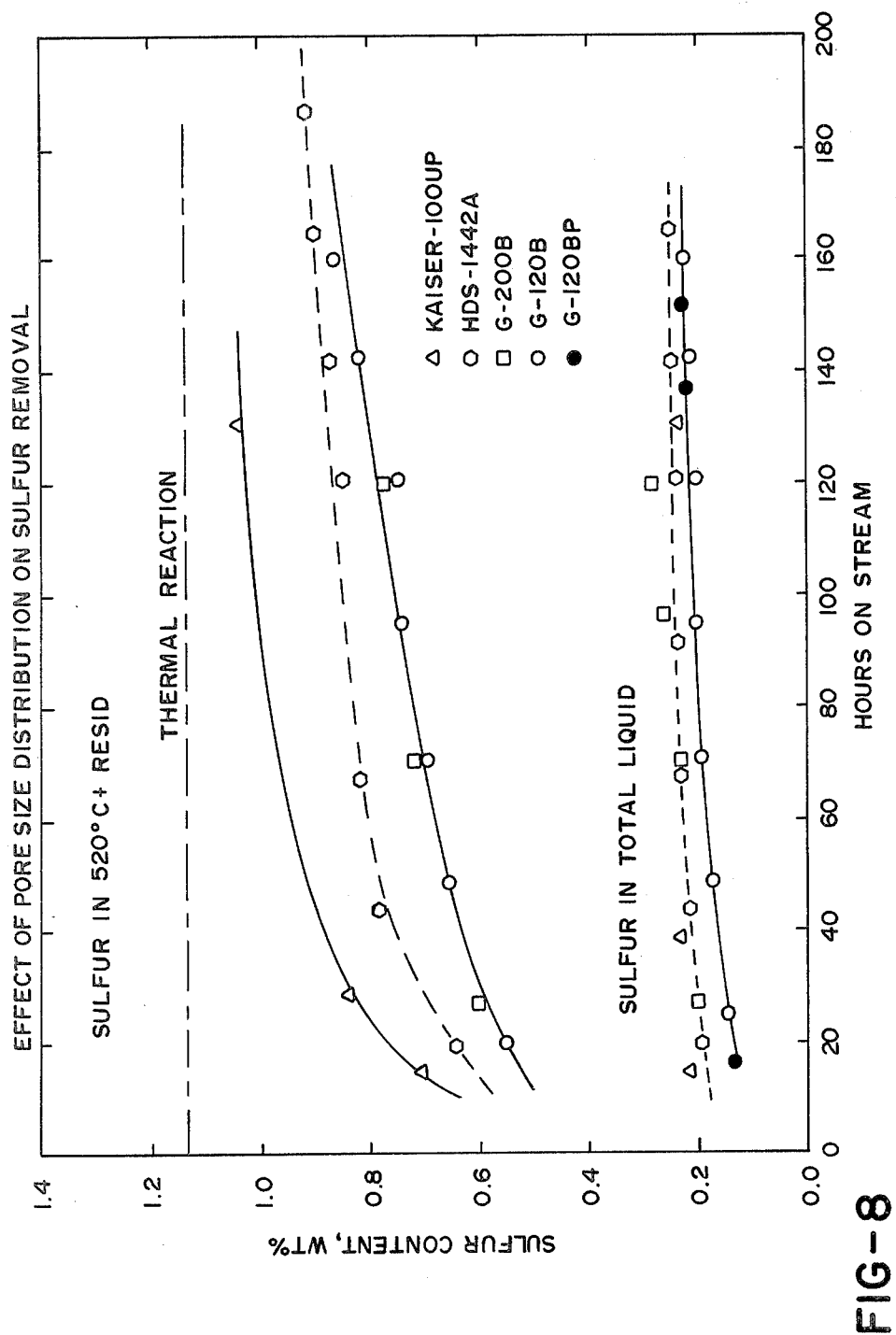

For desulfurization performance, the sulfur contents of 520° C.+resid fraction as well as total THF soluble liquid product are plotted in FIG. 8. The resid sulfur content is more meaningful and provides a direct measurement of desulfurization activity, since the 520° C.+resid fraction is derived entirely from coal and does not contain slurry oil. The unimodal Kaiser 100 Å CoMo catalyst exhibits reasonably good initial sulfur removal but the activity maintenance for resid desulfurization rapidly deteriorates with time (similar to benzene soluble conversion) and is only slightly better than thermal after 140 hours. The reference catalyst, HDS-1442A, shows about 0.8–0.9 weight % sulfur in resid. Increasing pore size to 120 Å corresponds to higher resid desulfurization. The resid sulfur content for the larger pore 200 A catalyst is practically the same as the 120 A catalyst. It suggests that the range of preferred pore sizes for resid desulfurization is somewhat broader than that for benzene soluble conversion. Batch test results indicated a rather narrow pore size range around 100 A in diameter for optimum desulfurization. However, this was based on the overall desulfurization of total liquid product, rather than the resid fraction.

The bottom portion of FIG. 8 shows the sulfur contents of total liquid products which include slurry oil. The G120 Å catalyst achieves the lowest sulfur level throughout the run. The other catalysts, with average pore size either greater or smaller than 120 Å, show higher sulfur contents although the differences are not large. To summarize, catalysts with relatively narrow pore size distribution around 120 Å such as G120B are the most effective for removing sulfur not only from resid, but also lower boiling fractions.

Table X presents other product qualities of 520° C.+resid as well as total liquid product. The resid nitrogen contents are the same level as the nitrogen content of maf coal; none of the catalysts seems to be very effective for resid denitrogenation at the test conditions used. There is some nitrogen removed from total liquid, and the basic nitrogen contents are approximately 56% of the total product nitrogen for the listed catalysts. Hydrogen content of the resid increased the most with the G120B and G200B catalysts corresponding to their good liquefaction performance. However, a lighter product (lower specific gravity) was produced with G120B catalysts as compared to the larger pore G200B catalysts.

From the above discussions, it is evident that catalysts prepared with G120 Å alumina exhibit the best overall performance for liquefaction and desulfurization. A bimodal pore distribution having small pores in the range of 70–200 Å is an important feature.

TABLE X
PRODUCT QUALITIES COBALT-MOLYBDENA CATALYSTS WITH VARYING SURFACE PROPERTIES

| Catalyst (CoMo) | Hours on Slurry | Sp. Gr. | S | N | Basic N | S | N | O | N | Atomic H/C |
|---|---|---|---|---|---|---|---|---|---|---|
| Thermal | — | 1.116* | .44 | .85 | .42 | 1.14 | 1.83 | 4.55 | 5.36 | .743 |
| HDS-1442A | 20 | 1.106 | .19 | .63 | .36 | .64 | 1.61 | 4.34 | 6.13 | .843 |
|  | 121 | 1.110 | .23 | .66 | .36 | .84 | 1.70 | 4.23 | 5.84 | .805 |
| Kaiser-100UP | 15 | 1.106 | .21 | .65 | — | .71 | 1.69 | 3.88 | 6.07 | .838 |
|  | 131 | 1.120 | .23 | .64 | — | 1.04 | 1.73 | 4.61 | 5.52 | .765 |
| G120B | 25 | 1.103 | .14 | .57 | .34 | .55 | 1.60 | 3.17 | 6.30 | .864 |
|  | 95 | 1.105 | .20 | .59 | .34 | .74 | 1.63 | 3.42 | 5.96 | .818 |
| G200B | 27 | 1.108 | .20 | .64 | — | .60 | 1.48 | — | 6.29 | .864 |
|  | 71 | 1.118 | .23 | .67 | .38 | .71 | 1.59 | 3.69 | 5.94 | .817 |

*At 64° C., others at 23° C.

What is claimed is:

1. A supported catalyst suitable for hydroconversion of coal solids to coal liquids, said catalyst comprising a catalytically active substance on support particles, said particles having essentially bimodal pore distribution with peak concentrations of smaller pores below about 600 angstroms and a peak concentration of larger pores above about 600 angstroms, the average diameter of the smaller pores ranging from about 100–200 angstroms, and the average diameter of the larger pores being in excess of 1,000 angstroms, said catalyst including at least 5% of the total pore volume of the larger pores and at least 70% of the total pore volume of the smaller pores.

2. The supported catalyst of claim 1 including from about 7 to 20% of the total pore volume of the smaller pores and about 80 to 93% of the total pore volume of the larger pores.

3. The supported catalyst of claim 1 in which said catalytically active substance contains molybdenum.

4. The supported catalyst of claim 1 with an average smaller pore diameter of about 120–140 angstroms.

5. The supported catalyst of claim 1 in which said support particles are comprised of alumina.

6. The supported catalyst of claim 1 having a surface area ranging from about 100 to 250 m$^2$/gm.

7. The supported catalyst of claim 3 in which said catalytically active substance consists essentially of unpromoted molybdenum.

8. The supported catalyst of claim 3 in which said catalytically active substance consists essentially of molybdenum and a member of the group consisting of cobalt, nickel, and mixtures thereof.

* * * * *